US011405176B2

(12) United States Patent
Ghosh et al.

(10) Patent No.: US 11,405,176 B2
(45) Date of Patent: Aug. 2, 2022

(54) HOMOMORPHIC ENCRYPTION FOR MACHINE LEARNING AND NEURAL NETWORKS USING HIGH-THROUGHPUT CRT EVALUATION

(71) Applicant: Intel Corporation, Santa Clara, CA (US)

(72) Inventors: Santosh Ghosh, Hillsboro, OR (US); Andrew Reinders, Portland, OR (US); Rafael Misoczki, Hillsboro, OR (US); Rosario Cammarota, San Diego, CA (US); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 8 days.

(21) Appl. No.: 17/025,337

(22) Filed: Sep. 18, 2020

(65) Prior Publication Data

US 2022/0094517 A1 Mar. 24, 2022

(51) Int. Cl.
*H04L 9/00* (2022.01)
*G06F 7/72* (2006.01)
*G06N 3/08* (2006.01)
*H04L 9/06* (2006.01)

(52) U.S. Cl.
CPC .............. *H04L 9/008* (2013.01); *G06F 7/722* (2013.01); *G06N 3/08* (2013.01); *H04L 9/0618* (2013.01)

(58) Field of Classification Search
CPC ....... H04L 9/008; H04L 9/0618; G06F 7/722; G06N 3/08
See application file for complete search history.

(56) References Cited

U.S. PATENT DOCUMENTS

| | | | |
|---|---|---|---|
| 10,075,288 B1* | 9/2018 | Khedr | H04L 9/30 |
| 2010/0146028 A1* | 6/2010 | Lambert | G06F 7/728 708/491 |

(Continued)

FOREIGN PATENT DOCUMENTS

| | | |
|---|---|---|
| CN | 114201782 A | 3/2022 |
| EP | 3972186 A1 | 3/2022 |

OTHER PUBLICATIONS

Agrawal Rashmi et al: "Fast Arithmetic Hardware Library For RLWE-Based Homomorphic Encryption", 2020 IEEE 28th Annual International Symposium on Field-Programmable Custom Computing Machines (FCCM), May 1, 2020 (Jul. 3, 2020), pp. 1-24, XP055873384, DOI: 10.1109/FCCM48280.2020.00037, Retrieved from the Internet: URL:https://ascslab.org/papers/he-library.pdf.

(Continued)

*Primary Examiner* — Vu V Tran
(74) *Attorney, Agent, or Firm* — Jaffery Watson Mendonsa & Hamilton LLP (57) ABSTRACT

Embodiments are directed to homomorphic encryption for machine learning and neural networks using high-throughput Chinese remainder theorem (CRT) evaluation. An embodiment of an apparatus includes a hardware accelerator to receive a ciphertext generated by homomorphic encryption (HE) for evaluation, decompose coefficients of the ciphertext into a set of decomposed coefficients, multiply the decomposed coefficients using a set of smaller modulus determined based on a larger modulus, and convert results of the multiplying back to an original form corresponding to the larger modulus.

17 Claims, 8 Drawing Sheets

(56) References Cited

U.S. PATENT DOCUMENTS

| | | | | |
|---|---|---|---|---|
| 2013/0216044 A1* | 8/2013 | Gentry | ............... | H04L 63/0442 380/277 |
| 2014/0139365 A1* | 5/2014 | Vun | ....................... | G06F 7/729 341/155 |
| 2014/0177828 A1* | 6/2014 | Loftus | .................. | H04L 9/0852 380/44 |
| 2017/0293913 A1* | 10/2017 | Gulak | ................. | G06Q 20/382 |

OTHER PUBLICATIONS

Extended European Search Report for European Patent Application No. 21185078.9 dated Jan. 4, 2022, 7 pages.
Riazi M Sadegh Mriazi@UCSD Edu et al: "HEAX An Architecture for Computing on Encrypted Data", Proceedings of the Twenty-Fifth International Conference on Architectural Support for Programming Languages and Operating Systems, ACM, New York, NY, USA, Mar. 9, 2020 (Mar. 9, 2020), pp. 1295-1309, XP058460507, DOI: 10.1145/3373376.3378523, ISBN: 978-1-4503-7102-5.

* cited by examiner

HOMOMORPHIC ENCRYPTION FOR MACHINE LEARNING AND NEURAL NETWORKS USING HIGH-THROUGHPUT CRT EVALUATION

TECHNICAL FIELD

Embodiments described herein generally relate to the field of computing systems and, more particularly, homomorphic encryption for machine learning and neural networks using high-throughput Chinese remainder theorem (CRT) evaluation.

BACKGROUND

Cryptographic computing may refer to solutions for computer system security that employ cryptographic mechanisms inside processor components. Some cryptographic computing systems may employ encryption and/or other cryptographic mechanisms inside a processor core on memory pointers or user data before such data leaves the processor boundary and enters some external memory unit or is communicated to some other device. One type of cryptographic computing is homomorphic encryption (HE). HE refers to a class of public encryption key encryption schemes that performs evaluation (e.g., addition and multiplication) on homomorphically-encrypted data.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Various embodiments are directed to techniques for homomorphic encryption for machine learning and neural networks using high-throughput Chinese remainder theorem (CRT) evaluation, for instance.

Homomorphic encryption (HE) refers to a form of encryption that allows computation on ciphertexts, generating an encrypted result which, when decrypted, matches the result of the operations as if they had been performed on the plaintext. HE identifies a class of public key encryption schemes that performs evaluation (e.g., addition and multiplication) on homomorphically-encrypted data. In modern HE schemes, ciphertexts can be organized as an algebraic ring with high dimensionality and large coefficients. For example, ring learning with errors (LWE) is a typical choice of an algebraic ring, in which a multiplication of two ciphertexts utilizes multiplying high-degree polynomials (e.g., of degree 8192), with coefficients modulo ("mod" or "modulus") a large integer (e.g., 220-bit).

Example application domains for HE include healthcare, finance and, in general, fields that benefit from the combined analysis of data contributed by multiple parties. Examples of workloads for HE applications include, but are not limited to, Logistic Regression Training, Bayesian Inference, or Neural Network.

One drawback of current HE applications is that evaluating a multiplication on homomorphically-encrypted data can be $10^5$ times slower compared to evaluating the same operation on plaintext. For example, as noted above, in HE schemes, ciphertexts can be organized as an algebraic ring with high dimensionality and large coefficients. As such, a result of the HE scheme is that a single native data type (e.g., integer, floating point, etc.) is encrypted into a more complex data structure. This more complex data structure can be a polynomial with coefficients of a certain bit width.

As a result, performing equivalent computational operations, such as addition and multiplication, in a native plaintext domain versus the HE domain, is also more complex. For example, performing multiplication of two 8-bit integers in the native domain results in a 16-bit output. However, the equivalent multiplication of the two 8-bit integers once encrypted in the HE domain can involve a few thousand element polynomials of coefficients that are a few hundred bits as input. This can involve more than one hundred thousand multiplications in the HE domain. As such, latency and throughout of coefficient multiplications in the HE domain are directly correlated to the overall performance of an HE evaluation.

Embodiments of the disclosure address the above-noted challenges of computational complexity in the HE domain by providing HE for machine learning and neural networks using high-throughput CRT evaluation. In implementations of the disclosure, a high-throughput CRT evaluation component is implemented to perform HE evaluations (e.g., multiplication, addition, etc.) by converting coefficients of the HE ciphertext to smaller integers, multiplying in mod $q_i$, and converting back to mod q.

The utilization of the high-throughput CRT evaluation component in the HE domain as described herein improves performance of computing complex operations on encrypted data for neural networks and training machine learning tasks including linear and logistic regression. As such, implementations of the disclosure improve overall computing device performance including processing unit utilization and improved latency in the computing architecture.

Figure 1:
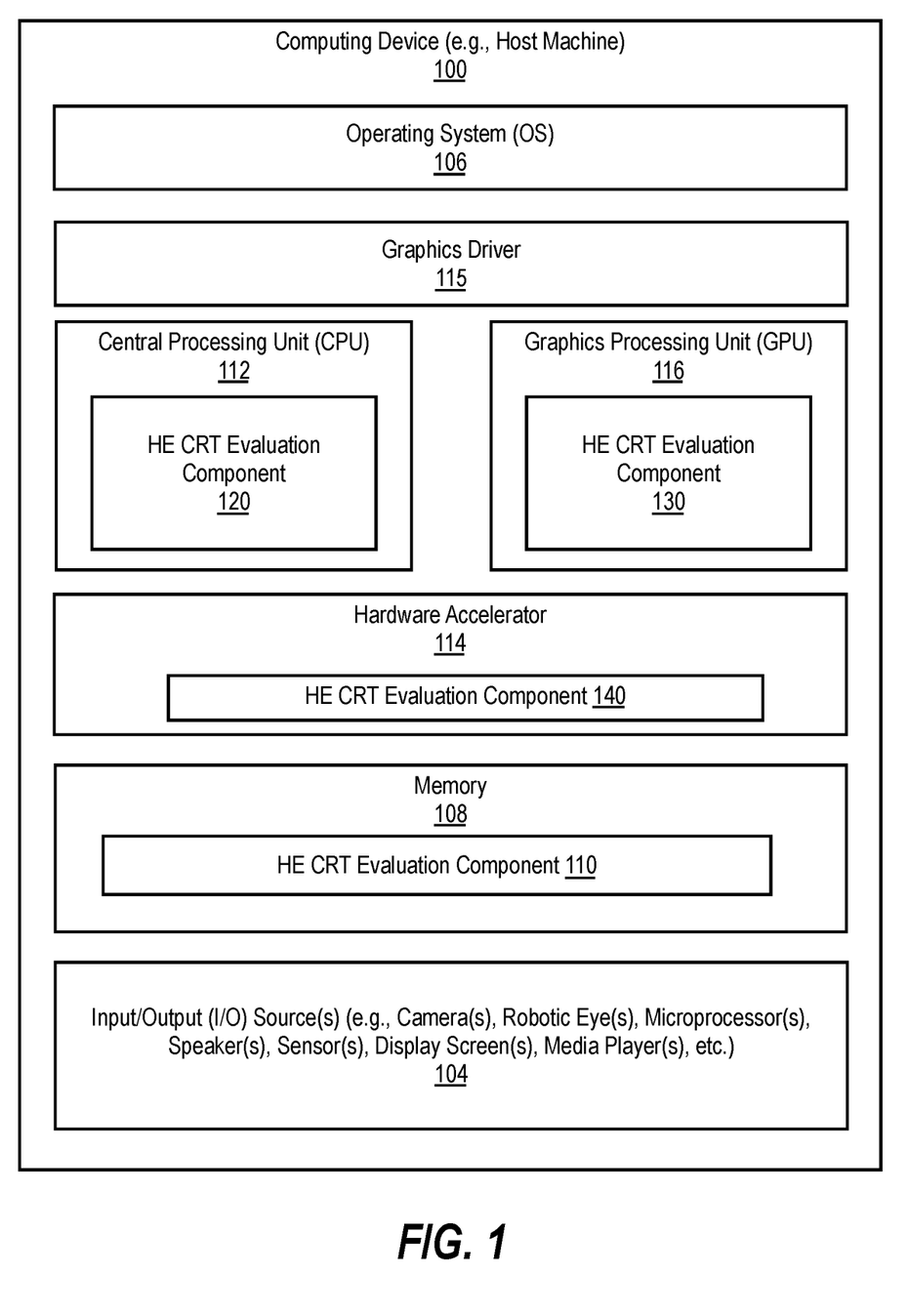
FIG. 1 illustrates a computing device employing a homomorphic encryption (HE) Chinese remainder theorem (CRT) evaluation component, according to implementations of the disclosure.

FIG. 1 illustrates a computing device 100 employing an HE CRT evaluation component 110 according to one implementation of the disclosure. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SOC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), user-mode driver framework (UMDF), or simply "driver") 115, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be utilized for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, HE CRT evaluation component 110 may be hosted by memory 108 in communication with I/O source(s) 104, such as microphones, speakers, etc., of computing device 100. In another embodiment, HE CRT evaluation component 110 may be part of or hosted by operating system 106. In yet another embodiment, HE CRT evaluation component 110 may be hosted or facilitated by graphics driver 115. In yet another embodiment, HE CRT evaluation component 110 may be hosted by or part of a hardware accelerator 114; for example, HE CRT evaluation component 110 may be embedded in or implemented as part of the processing hardware of hardware accelerator 114, such as in the form of HE CRT evaluation component 140. In yet another embodiment, HE CRT evaluation component 110 may be hosted by or part of graphics processing unit ("GPU" or simply graphics processor") 116 or firmware of graphics processor 116; for example HE CRT multiplication component may be embedded in or implemented as part of the processing hardware of graphics processor 116, such as in the form of HE CRT evaluation component 130. Similarly, in yet another embodiment, HE CRT evaluation component 110 may be hosted by or part of central processing unit ("CPU" or simply "application processor") 112; for example, HE CRT evaluation component 120 may be embedded in or implemented as part of the processing hardware of application processor 112, such as in the form of HE CRT evaluation component 120. In some embodiments, HE CRT evaluation component 110 may be provided by one or more processors including one or more of a graphics processor, an application processor, and another processor, wherein the one or more processors are co-located on a common semiconductor package.

It is contemplated that embodiments are not limited to certain implementation or hosting of HE CRT evaluation component 110 and that one or more portions or components of HE CRT evaluation component 110 may be employed or implemented as hardware, software, or any combination thereof, such as firmware. In one embodiment, for example, the HE CRT evaluation component may be hosted by a machine learning processing unit which is different from the GPU. In another embodiment, the HE CRT evaluation component may be distributed between a machine learning processing unit and a CPU. In another embodiment, the HE CRT evaluation component may be distributed between a machine learning processing unit, a CPU and a GPU. In another embodiment, the HE CRT evaluation component may be distributed between a machine learning processing unit, a CPU, a GPU, and a hardware accelerator.

Computing device 100 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
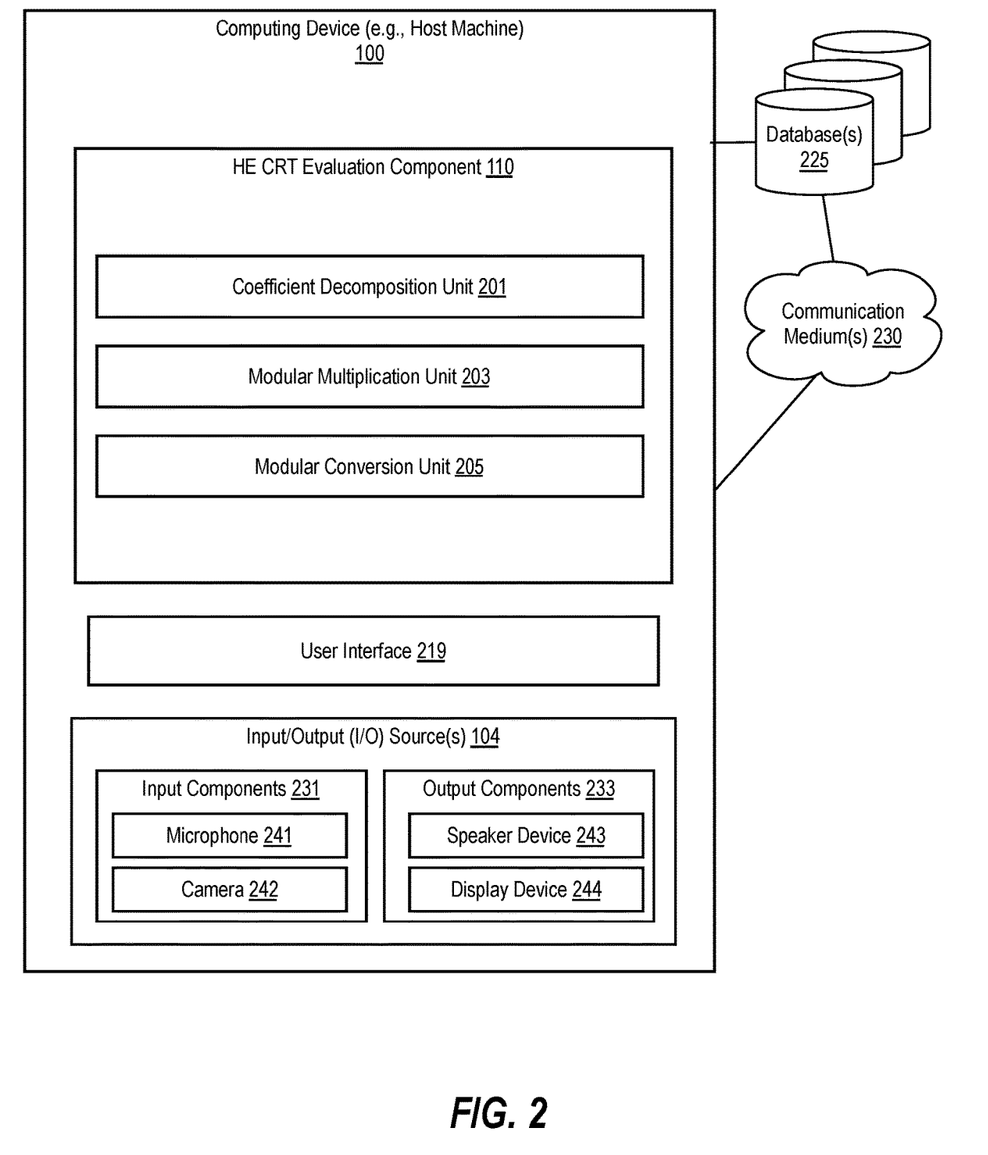
FIG. 2 illustrates HE CRT evaluation component, according to one implementation of the disclosure.

FIG. 2 illustrates HE CRT evaluation component 110 of FIG. 1, according to one implementation of the disclosure. For brevity, many of the details already discussed with reference to FIG. 1 are not repeated or discussed hereafter. In one embodiment, HE CRT evaluation component 110 may be the same as any of HE CRT evaluation components 110, 120, 130, 140 described with respect to FIG. 1 and may include any number and type of components, such as (without limitations): coefficient decomposition unit 201; modular multiplication unit 203; and modular conversion unit 205.

Computing device 100 is further shown to include user interface 219 (e.g., graphical user interface (GUI) based user interface, Web browser, cloud-based platform user interface, software application-based user interface, other user or application programming interfaces (APIs), etc.). Computing device 100 may further include I/O source(s) 104 having input component (s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or other details, and/or the like.

As aforementioned, computing device 100 may host I/O sources 104 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as HE CRT evaluation component 120, HE CRT evaluation component 130, and/or HE CRT evaluation component 140 hosted by application processor 112, graphics processor 116, and/or hardware accelerator 114, respectively, of FIG. 1 having to facilitate or execute the corresponding logic to perform certain tasks.

For example, as illustrated, input component (s) 231 may include any number and type of microphone(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

As previously described, conventional HE architectures for machine learning and deep learning solutions are associated with computational complexity and latency issues. Embodiments provide for a novel technique for HE for machine learning and neural networks using high-throughput CRT evaluation, such as multiplication and addition. This novel technique is used to address the above-noted complexity and/or performance issues in computing architectures seeking to implement HE. Implementations of the disclosure utilize an HE CRT evaluation component 120 to convert coefficients of HE ciphertext to smaller integers, multiply the smaller integers in mod $q_i$, and convert results back to mod q.

With respect to FIG. 2, the HE CRT evaluation component 110 includes a coefficient decomposition unit 201, a modular multiplication unit 203, and a modular conversion unit 205 to perform the HE CRT evaluations of HE CRT evaluation component 110. In implementations of the disclosure, the operations of units 201, 203, 205 of HE CRT evaluation component 110 are based on modular arithmetic and CRT evaluations. For example, HE CRT evaluation component 110 may be based on the context of, for example, Modulus $q=q_1 \times q_2 \times \ldots \times q_j$, where each $q_i = 2^k + \sum_{t=1}^{up\ to\ 4} \pm 2^x$, $1 \le i \le j$, $0 \le x \le k-1$. These modulus q allow for breaking the coefficients into smaller parts by the coefficient decomposition unit 201, multiplying these smaller parts independently (and in parallel) with smaller modulus qi, $1 \le i \le j$ by the module multiplication unit 203, and reconstructing the results back together using a reverse CRT technique at the modular conversion unit 205. CRT states that if one knows the remainders of the Euclidean division of an integer n by several integers, then one can determine the remainder of the division of n by the product of these integers, under the condition that the divisors are pairwise coprime. Further details of the coefficient decomposition unit 201, the modular multiplication unit 203, and the modular conversion unit 205 are described below with respect to FIGS. 3-6.

In one implementation, the HE CRT evaluation component 110 utilizes a target size 'n' of a modulus q, and determines a set of size k, where k=n/d, e.g., $2 \le d \le 10$. In implementations of the disclosure, the HE CRT evaluation component 110 also utilizes at least one of a generalized or Pseudo Mersenne Primes as smaller modulus. A Mersenne prime refers to a prime number that is one less than a power of two. That is, it is a prime number of the form $M_n=2^n-1$ for some integer n. A generalized Mersenne prime is a prime number of the form $p=f(2^n)$. A pseudo Mersenne prime is a prime number of the form $p=2^n-k$.

For example, eight 28-bit $q_i=2^{28}-k_i$, $1 \le i \le 8$ and so 224-bit $q=q_1 \times q_2 \times \ldots \times q_8$. This provides improved latency gains compared to the conventional approaches of selecting the q, because reduction by random $q_i$ involves a division by $q_i$.

Figure 3:
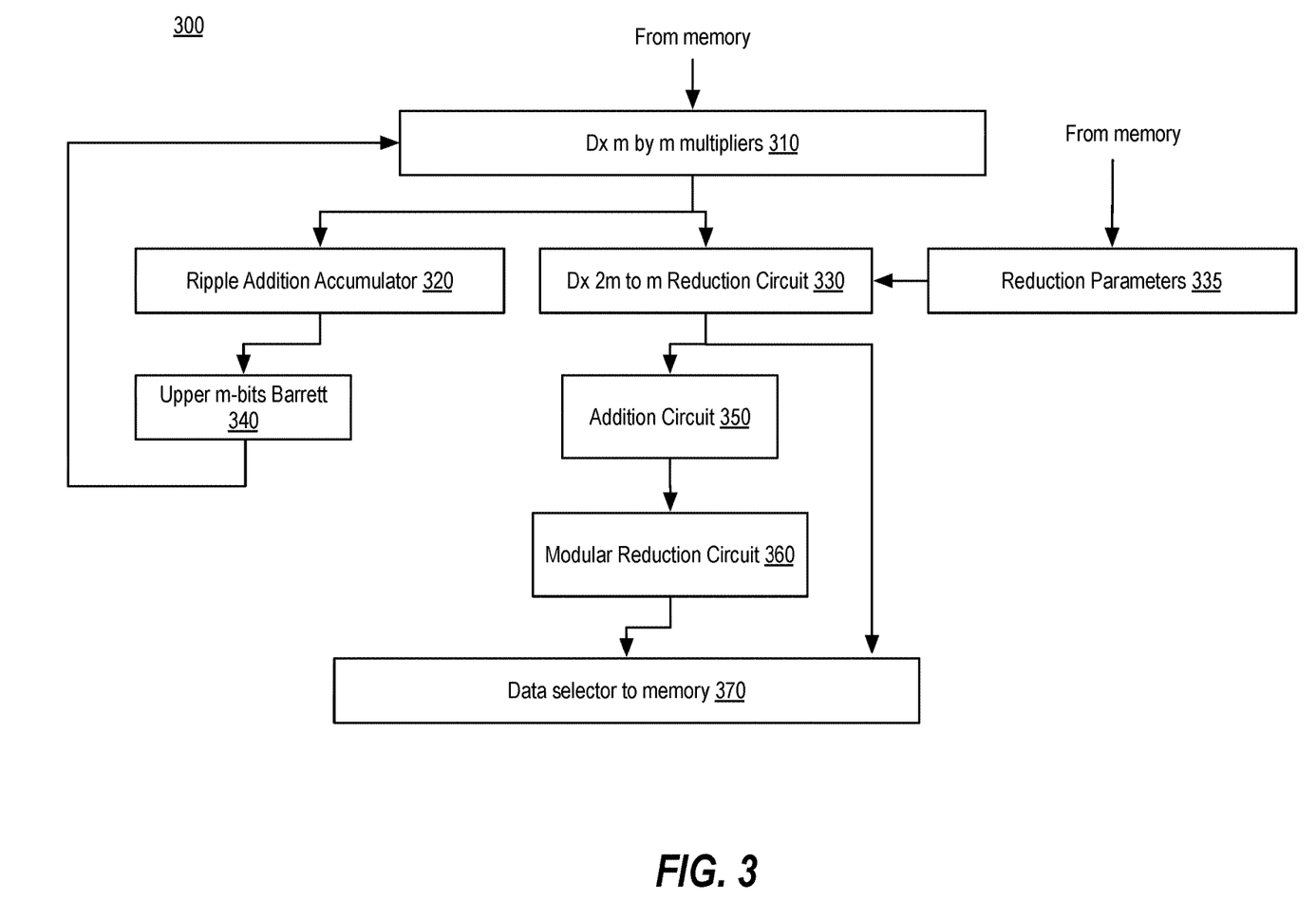
FIG. 3 is a block diagram depicting an example architectural diagram of an HE CRT evaluation component in accordance with implementations of the disclosure.

FIG. 3 is a block diagram depicting an example architectural diagram of an HE CRT evaluation component 300 in accordance with implementations of the disclosure. In one implementation, the HE CRT evaluation component 300 may be the same as HE CRT evaluation component 120 described with respect to FIGS. 1 and 2. In one implementation, the HE CRT evaluation component 300 includes a determined (e.g., d times or dx) number of multipliers 310, a ripple addition accumulator 320, a determined number (e.g., d times or dx) of 2 m to m reduction circuits 330, reduction parameters 335, an upper m-bits Barrett multiplier 340, an addition circuit 350, a modular reduction circuit 360, and a data selector 370. More or less components than those illustrated with respect to FIG. 3 may be implemented in implementations of the disclosure.

In one example, the HE CRT evaluation component 300 provides, for numbers with a CRT decomposition, 'd' parallel multipliers 310 for small operands of width 'm' for multiplications. To provide the small operand format, the HE CRT evaluation component 300 can convert to CRT decomposition using, for example, the multipliers 310, 2 m to m reduction circuit 330 (with reduction parameters 335), addition circuit 350, and modular bit reduction circuit 360. In implementations of the disclosure, the modular reduction circuit 360 can be a m+3-bit to m bit reduction circuit when operating on 8-bit elements, for example. For example, for each modulus $p_i$, the HE CRT evaluation component 300 can store $2^{km} \mod p_i$ for each k from 0 to d−1 in a vector. The multipliers 310 are then used to multiply $2^{km} \mod p_i$ by the bits of significance $p_i$. In one implementation, a constraint includes the values of $2^{km} \mod p_i$ summing to less than $2^m$ as efficient.

The HE CRT evaluation component 300 then can re-use the multipliers 310 and 2 m to m reduction circuits 330 (with reduction parameters 335) to perform multiplication of the converted and CRT-decomposed operands.

After multiplication by the multipliers 310 and reduction by the 2 m to m reduction circuits 330, the HE CRT evaluation component 300 converts the results back to mod q. For conversion back, the HE CRT evaluation component 300 may re-use the multipliers 310, 2 m to m reduction circuits 330 (with reduction parameters 335), ripple addition accumulators 320, and upper m-bits Barrett multiplier(s) 340. For example, implementations of the disclosure can determine a number which is $a_i \mod p_i$. The HE CRT evaluation component 300 determines this number by letting $p=PI(p_i)$ and letting $b_i=p/p_i$ and $b_i'=b_i^{-1} \mod p_i$. Then, the HE CRT evaluation component computes $a_i'=a_ib_i' \mod p_i$ and then compute $a_i'b_i=a_i \mod p_i$, $0 \mod p_{j \ne i}$. The addition circuit 350 can then sum all $a_i'b_i$ to recover x mod p, but x is up to d p. The HE CRT evaluation component 300 further performs small Barrett multiplication of upper m bits at upper m-bits Barrett multiplier 340, followed by full multiplier 310. The data selector to memory 370 enables the end result of the HE evaluation of HE CRT evaluation component 300 to be sent to memory.

In implementations of the disclosure, the HE CRT evaluation component 300 enables parallel reduction. In one example of parallel reduction by the HE CRT evaluation component 300, the Barrett multiplier 340 looks like [1, 1, $1^2$]. Multiplied into [a, b]=$2^m$a+b, this looks like [a, 1 a+b, $1^2$a+1 b, $1^2$ b], and so on. As a result, the computed value is $r=a+(1a+b)/2^m+1(1a+b)/2^{2m}$ and so on. The HE CRT evaluation component 300 multiplies this by $2^m-1$, and subtracts from [a, b], which gives $1a+b+1(1a+b)/2^{-m}+1^2 (1a+b)/2^{-2m}$. Furthermore, the HE CRT evaluation component 300 computes 1a+b, which fits in |1|+m bits, and is equal to [a, b] mod $2^m$. This can be reduced in the same way, by multiplying the upper |1| bits again by 1, and adding back into this value. Therefore, in two steps, the number is reduced to a value at most m+1 bits. The HE CRT evaluation component 300 adds 1 to this value, and if the upper bit is set, this value is selected; otherwise, the original value is selected. The small size of 1 allows these |1| by m and |1| by |1| multiplication circuits to be small.

Figure 4:
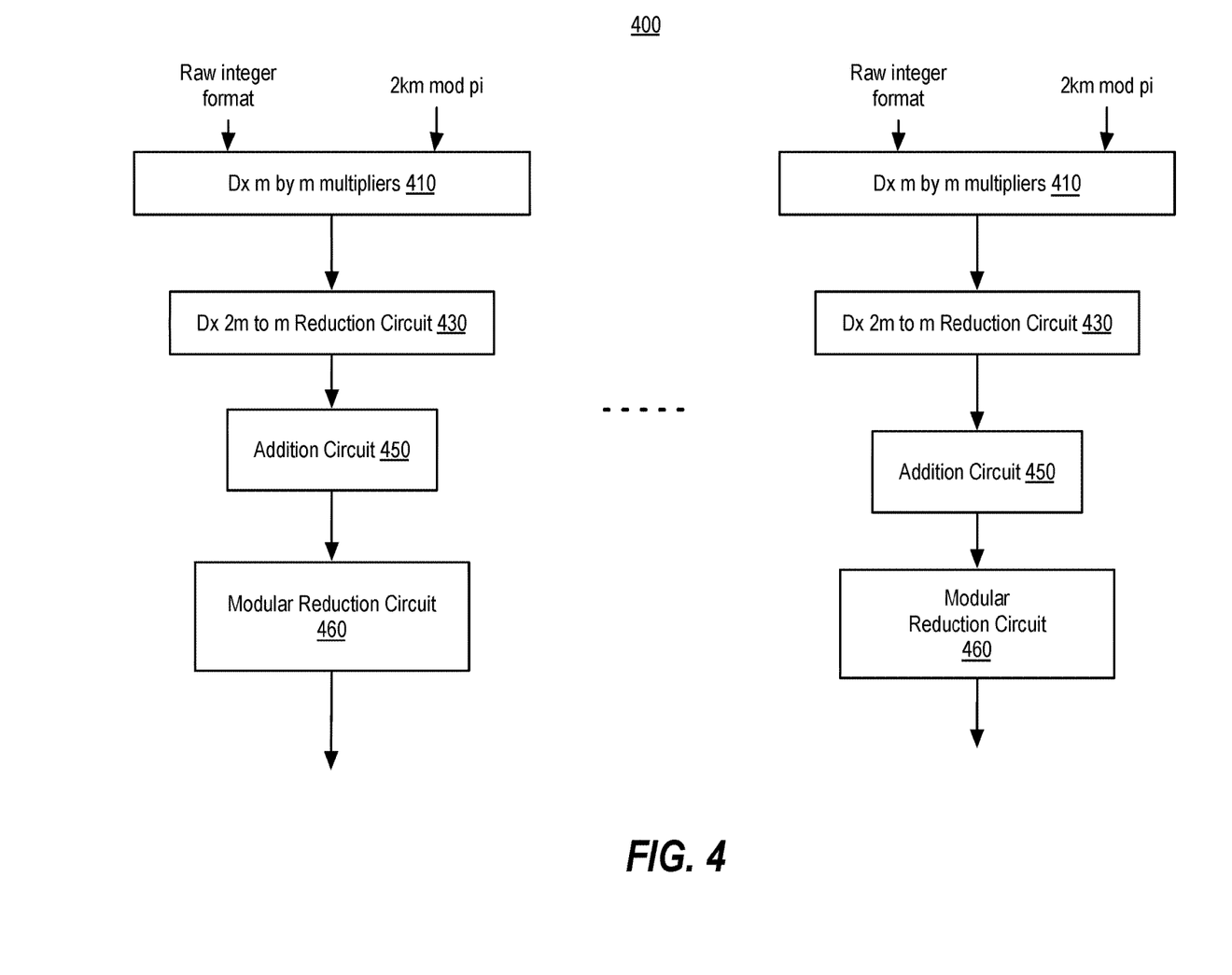
FIG. 4 illustrates a block diagram of a coefficient decomposition unit of an HE CRT evaluation component, in accordance with implementations of the disclosure.

FIG. 4 illustrates a block diagram of a coefficient decomposition unit 400 of an HE CRT evaluation component, in accordance with implementations of the disclosure. In one implementation, coefficient decomposition unit 400 is the same as coefficient decomposition unit 201 described with respect to FIG. 2. In one implementation, the coefficient decomposition unit 400 includes components that are part of the HE CRT evaluation component 300 described with respect to FIG. 3 that are utilized for the purpose of coefficient decomposition for evaluations on ciphertext in the HE domain. As illustrated in FIG. 4, a plurality of repeated coefficient decomposition unit circuits are illustrated as implemented. The number of repeated coefficient decomposition unit circuits implemented may depend on the particular integer format and data size utilized in implementations of the disclosure. The particular depiction of coefficient decomposition unit 400 described with respect to FIG. 4 is just one example of a circuit components that may be utilized, and more or less components may be implemented as part of coefficient decomposition unit 400 in various implementations of the disclosure.

In one implementation, coefficient decomposition unit 400 makes use of the wide m by m multipliers 410 and the 2 m to m reduction circuits 430 to perform most of the work of CRT decomposition. In one example, each word $n_j$ of a large integer n has an implicit multiplier $2^{(7-j)m}$, and the coefficient decomposition unit 400 reduces that mod $p_i$ as a precomputed value. Then, $n_j (2^{(7-j)m} \mod p_i)$ is an m by m product, which can be reduced mod $p_i$. All resulting products can be combined in the next cycle by a sum-and-reduce module implemented by addition circuit 450 and modular reduction circuit 460 (e.g., a m+3-bit to m bit reduction circuit when operating on 8-bit elements).

Figure 5:
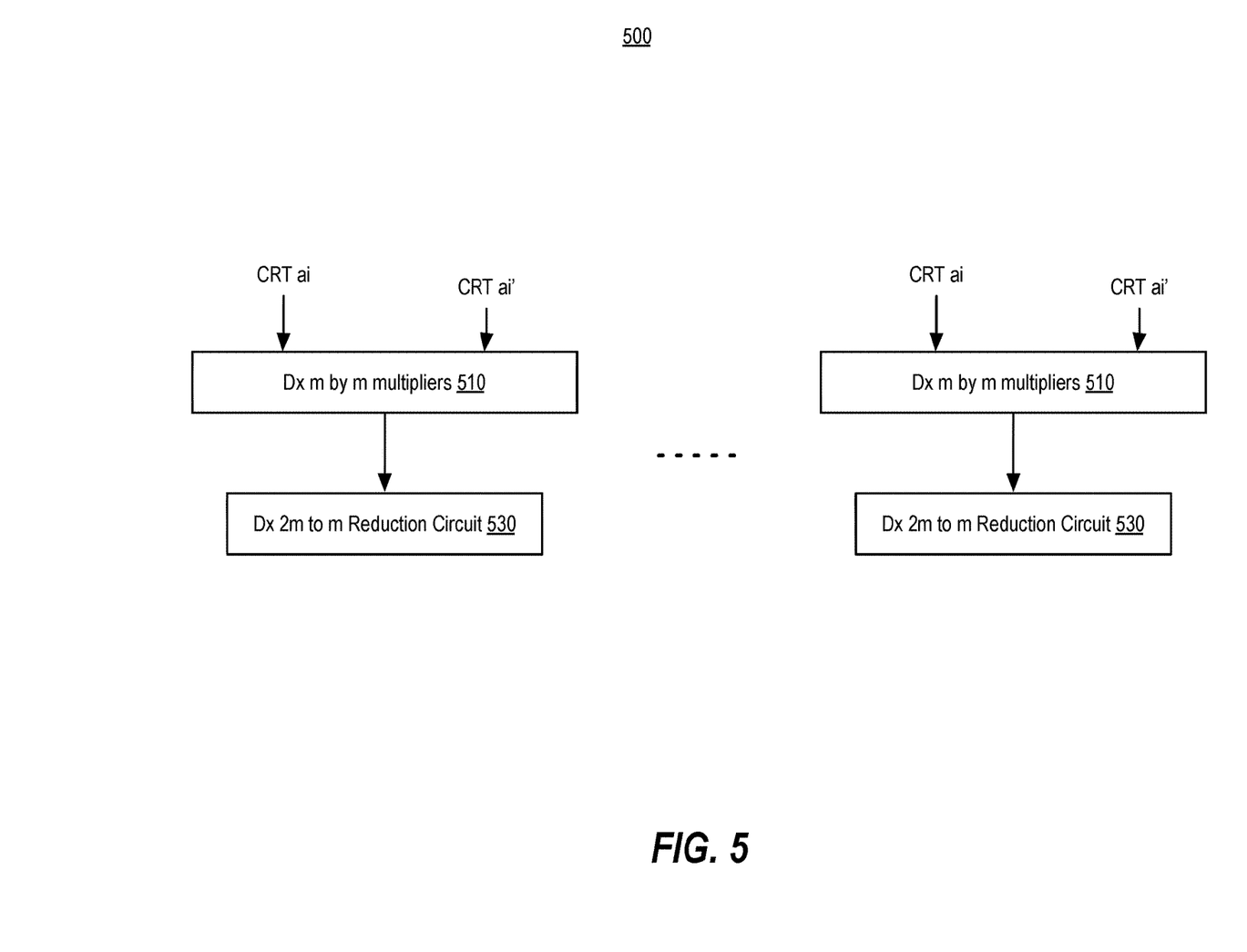
FIG. 5 illustrates a block diagram of a modular multiplication unit of an HE CRT evaluation component, in accordance with implementations of the disclosure.

FIG. 5 illustrates a block diagram of a modular multiplication unit 500 of an HE CRT evaluation component, in accordance with implementations of the disclosure. In one implementation, modular multiplication unit 500 is the same as modular multiplication unit 203 described with respect to FIG. 2. In one implementation, the modular multiplication unit 500 includes components that are part of the HE CRT evaluation component 300 described with respect to FIG. 3 that are utilized for the purpose of modular multiplication for evaluations on ciphertext in the HE domain. As illustrated in FIG. 5, a plurality of repeated modular multiplication unit circuits are illustrated as implemented. The number of repeated modular multiplication unit circuits implemented may depend on the particular integer format and data size utilized in implementations of the disclosure. The particular depiction of modular multiplication unit 500 described with respect to FIG. 5 is just one example of a circuit components that may be utilized, and more or less components may be implemented as part modular multiplication unit 500 in various implementations of the disclosure.

In one implementation, modular multiplication unit 500 operates on the decomposed coefficients generated by coefficient decomposition unit 400 described with respect to FIG. 4. As the numbers operated on by the modular multiplication unit 500 are represented in a decomposed format, the product is computed by, for example, 'd' multipliers 510, each m by m, and by m by m reductions. In this mode, each of the 2 m to m Barrett modules 530 is set for a different prime $p_i$.

Figure 6:
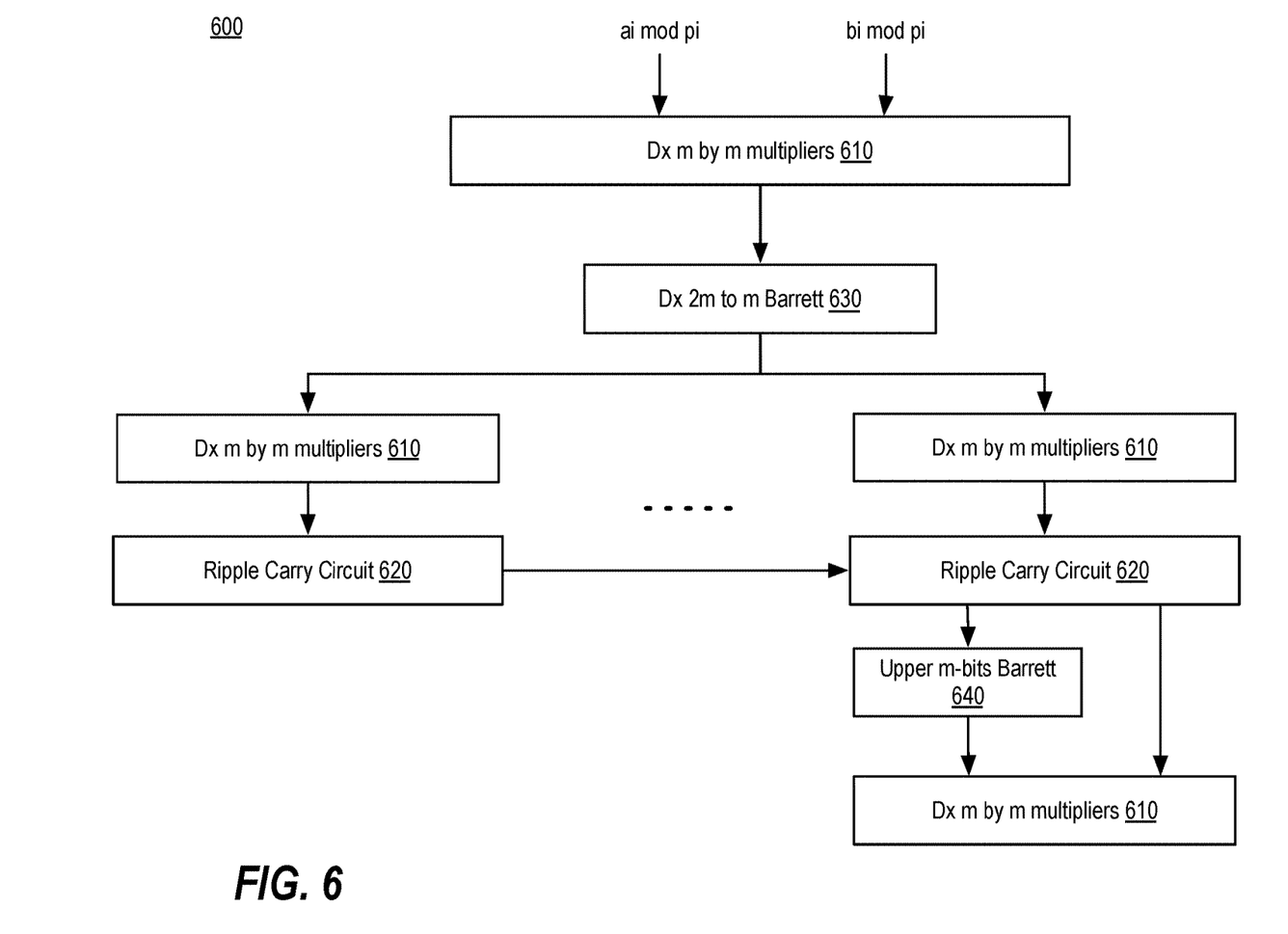
FIG. 6 illustrates a block diagram of a modular conversion unit of an HE CRT evaluation component, in accordance with implementations of the disclosure.

FIG. 6 illustrates a block diagram of a modular conversion unit 600 of an HE CRT evaluation component, in accordance with implementations of the disclosure. In one implementation, modular conversion unit 600 is the same as modular conversion unit 205 described with respect to FIG. 2. In one implementation, modular conversion unit 600 includes components that are part of the HE CRT evaluation component 300 described with respect to FIG. 3 that are utilized for the purpose of modular conversions for evaluations on ciphertext in the HE domain.

As illustrated in FIG. 6, a plurality of repeated modular conversion unit circuits are illustrated as implemented. The number of repeated modular conversion unit circuits implemented may depend on the particular integer format and data size utilized in implementations of the disclosure. The particular depiction of modular conversion unit 600 described with respect to FIG. 6 is just one example of a circuit components that may be utilized, and more or less components may be implemented as part modular conversion unit 600 in various implementations of the disclosure.

In one implementation, modular conversion unit 600 depicts the reuse of the HE CRT evaluation component hardware to perform a reverse CRT transform. A first step for the reverse CRT transform by modular conversion unit uses the multipliers 610 to multiply by the inverse of the product $p_i$ for $j \neq i$, taken mod $p_i$. A second step multiplies, using a 2 m to m Barrett circuit 630, this number by this product, giving a number that is equal to $n_i$ mod $p_i$ and 0 mod $p_j$, $j \neq i$. This is done by adding a ripple adder 620 to the multiplier 610. The sum of all resulting copies gives something bounded by 8 p, and this can be reduced with a single Barrett product 640 to a number that is possibly greater than p but no larger than it. As noted above, multiple iterations of the hardware can be combined together to process one number per cycle with minimal memory access possible.

Figure 7:
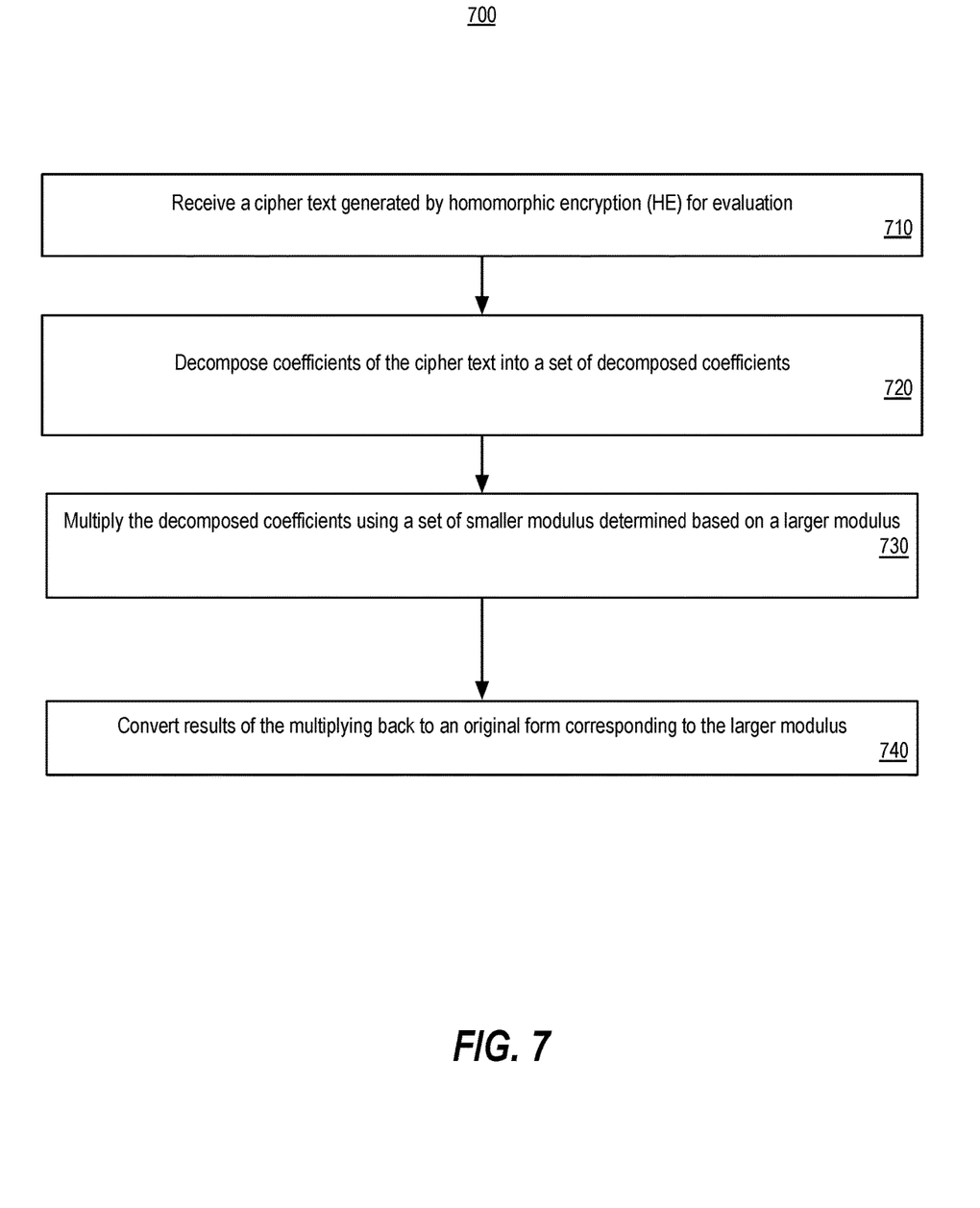
FIG. 7 illustrates an example flow for HE for machine learning and neural networks using high-throughput CRT evaluation, in accordance with certain implementations of the disclosure.

FIG. 7 illustrates an example flow 700 for HE for machine learning and neural networks using high-throughput CRT evaluation, in accordance with certain embodiments. The various operations of the flow may be performed by any suitable circuitry, such as a hardware accelerator, a processor or processing unit of a computing device, a controller of a computing device, a controller of a memory module, or other components of a computing device. The example flow 700 may be representative of some or all the operations that may be executed by or implemented on one or more components of computing device 100 of FIGS. 1 and 2, and/or HE CRT evaluation component 300 of FIG. 3. The embodiments are not limited in this context.

At block 710, the computing device may receive a ciphertext generated by HE for evaluation. As discussed above, the ciphertext generated by HE includes a plurality of coefficients. Then, at block 720, the computing device may decompose coefficients of the ciphertext into a set of decomposed coefficients. In one implementations, the coefficients are decomposed using a CRT decomposition of the coefficients. In some implementations, a set of multiplier circuits, reduction circuits, addition circuits, and modular reduction circuits are implemented to perform the CRT decomposition of the coefficients.

Subsequently, at block 730, the computing device may multiply the decomposed coefficients using a set of smaller modulus determined based on a larger modulus. In one implementations, the decomposed coefficients are multiplied independently from one another using a smaller modulus, where the smaller modulus includes either generalized Mersenne primes or pseudo Mersenne primes. In some implementations, a set of multiplier circuits and reduction circuits are utilized to perform the multiplication on the decomposed coefficients.

Lastly, at block 740, the computing device may convert results of the multiplying back to an original form corresponding to the larger modulus. In one implementation, the results are converted by performing a reverse CRT transform on the results of the multiplying. In some implementations, a set of multiplier circuits, 2 m to m Barrett circuits, ripple carry circuits, upper m-bits Barrett circuits, and reduction circuits are utilized to perform the reverse CRT transform of the results.

Figure 8:
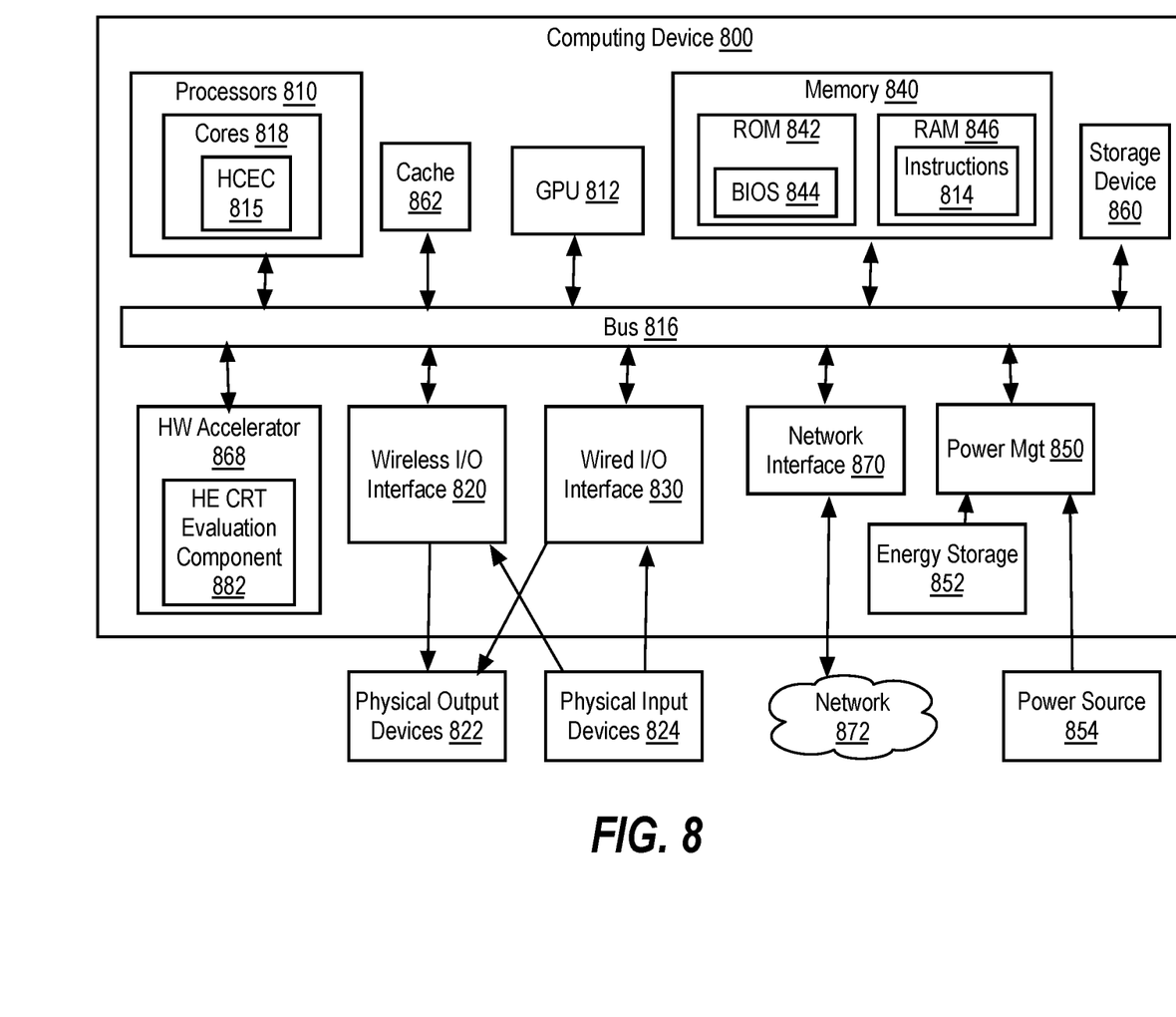
FIG. 8 is a schematic diagram of an illustrative electronic computing device to enable HE for machine learning and neural networks using high-throughput CRT evaluation according to some implementations of the disclosure.

FIG. 8 is a schematic diagram of an illustrative electronic computing device to enable HE for machine learning and neural networks using high-throughput CRT evaluation according to some embodiments. In some embodiments, the computing device 800 includes one or more processors 810 including one or more processors cores 818 including an HE CRT evaluation component (HCEC) 815, such as HE CRT evaluation component 110-140 described with respect to FIG. 1 or HE CRT evaluation component 300 described with respect to FIG. 3. In some embodiments, the computing device 800 includes a hardware accelerator 868, the hardware accelerator including an HE CRT evaluation component 882, such as HE CRT evaluation component 110-140 described with respect to FIG. 1 or HE CRT evaluation component 300 described with respect to FIG. 3. In some embodiments, the computing device is to provide HE for machine learning and neural networks using high-throughput CRT evaluation, as provided in FIGS. 1-7.

The computing device 800 may additionally include one or more of the following: cache 862, a graphical processing unit (GPU) 812 (which may be the hardware accelerator in some implementations), a wireless input/output (I/O) interface 820, a wired I/O interface 830, system memory 840 (e.g., memory circuitry), power management circuitry 850, non-transitory storage device 860, and a network interface 870 for connection to a network 872. The following discussion provides a brief, general description of the components forming the illustrative computing device 800. Example, non-limiting computing devices 800 may include a desktop computing device, blade server device, workstation, or similar device or system.

In embodiments, the processor cores 818 are capable of executing machine-readable instruction sets 814, reading data and/or instruction sets 814 from one or more storage devices 860 and writing data to the one or more storage devices 860. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 818 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 800 includes a bus or similar communications link 816 that communicably couples and facilitates the exchange of information and/or data between various system components including the processor cores 818, the cache 862, the graphics processor circuitry 812, one or more wireless I/O interfaces 820, one or more wired I/O interfaces 830, one or more storage devices 860, and/or one or more network interfaces 870. The computing device 800 may be referred to in the singular herein, but this is not intended to limit the embodiments to a single computing device 800, since in certain embodiments, there may be more than one computing device 800 that incorporates, includes, or contains any number of communicably coupled, collocated, or remote networked circuits or devices.

The processor cores 818 may include any number, type, or combination of currently available or future developed devices capable of executing machine-readable instruction sets.

The processor cores 818 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks are not described in further detail herein, as they should be understood by those skilled in the relevant art. The bus 816 that interconnects at least some of the components of the computing device 800 may employ any currently available or future developed serial or parallel bus structures or architectures.

The system memory 840 may include read-only memory ("ROM") 842 and random access memory ("RAM") 846. A portion of the ROM 842 may be used to store or otherwise retain a basic input/output system ("BIOS") 844. The BIOS 844 provides basic functionality to the computing device 800, for example by causing the processor cores 818 to load and/or execute one or more machine-readable instruction sets 814. In embodiments, at least some of the one or more machine-readable instruction sets 814 cause at least a portion of the processor cores 818 to provide, create, produce, transition, and/or function as a dedicated, specific, and particular machine, for example a word processing machine, a digital image acquisition machine, a media playing machine, a gaming system, a communications device, a smartphone, or similar.

The computing device 800 may include at least one wireless input/output (I/O) interface 820. The at least one wireless I/O interface 820 may be communicably coupled to one or more physical output devices 822 (tactile devices, video displays, audio output devices, hardcopy output devices, etc.). The at least one wireless I/O interface 820 may communicably couple to one or more physical input devices 824 (pointing devices, touchscreens, keyboards, tactile devices, etc.). The at least one wireless I/O interface 820 may include any currently available or future developed wireless I/O interface. Example wireless I/O interfaces include, but are not limited to: BLUETOOTH®, near field communication (NFC), and similar.

The computing device 800 may include one or more wired input/output (I/O) interfaces 830. The at least one wired I/O interface 830 may be communicably coupled to one or more physical output devices 822 (tactile devices, video displays, audio output devices, hardcopy output devices, etc.). The at least one wired I/O interface 830 may be communicably coupled to one or more physical input devices 824 (pointing devices, touchscreens, keyboards, tactile devices, etc.). The wired I/O interface 830 may include any currently available or future developed I/O interface. Example wired I/O interfaces include, but are not limited to: universal serial bus (USB), IEEE 1394 ("FireWire"), and similar.

The computing device 800 may include one or more communicably coupled, non-transitory, data storage devices 860. The data storage devices 860 may include one or more hard disk drives (HDDs) and/or one or more solid-state storage devices (SSDs). The one or more data storage devices 860 may include any current or future developed storage appliances, network storage devices, and/or systems. Non-limiting examples of such data storage devices 860 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 860 may include one or more removable storage devices, such as one or more flash drives, flash memories, flash storage units, or similar appliances or devices capable of communicable coupling to and decoupling from the computing device 800.

The one or more data storage devices 860 may include interfaces or controllers (not shown) communicatively coupling the respective storage device or system to the bus 816. The one or more data storage devices 860 may store, retain, or otherwise contain machine-readable instruction sets, data structures, program modules, data stores, databases, logical structures, and/or other data useful to the processor cores 818 and/or graphics processor circuitry 812 and/or one or more applications executed on or by the processor cores 818 and/or graphics processor circuitry 812. In some instances, one or more data storage devices 860 may be communicably coupled to the processor cores 818, for example via the bus 816 or via one or more wired communications interfaces 830

(e.g., Universal Serial Bus or USB); one or more wireless communications interfaces 820 (e.g., Bluetooth®, Near Field Communication or NFC); and/or one or more network interfaces 870 (IEEE 802.3 or Ethernet, IEEE 802.11, or Wi-Fi®, etc.).

Processor-readable instruction sets 814 and other programs, applications, logic sets, and/or modules may be stored in whole or in part in the system memory 840. Such instruction sets 814 may be transferred, in whole or in part, from the one or more data storage devices 860. The instruction sets 814 may be loaded, stored, or otherwise retained in system memory 840, in whole or in part, during execution by the processor cores 818 and/or graphics processor circuitry 812.

The computing device 800 may include power management circuitry 850 that controls one or more operational aspects of the energy storage device 852. In embodiments, the energy storage device 852 may include one or more primary (i.e., non-rechargeable) or secondary (i.e., rechargeable) batteries or similar energy storage devices. In embodiments, the energy storage device 852 may include one or more supercapacitors or ultracapacitors. In embodiments, the power management circuitry 850 may alter, adjust, or control the flow of energy from an external power source 854 to the energy storage device 852 and/or to the computing device 800. The power source 854 may include, but is not limited to, a solar power system, a commercial electric grid, a portable generator, an external energy storage device, or any combination thereof.

For convenience, the processor cores 818, the graphics processor circuitry 812, the wireless I/O interface 820, the wired I/O interface 830, the storage device 860, and the network interface 870 are illustrated as communicatively coupled to each other via the bus 816, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 818 and/or the graphics processor circuitry 812. In some embodiments, all or a portion of the bus 816 may be omitted and the components are coupled directly to each other using suitable wired or wireless connections.

The following examples pertain to further embodiments. Example 1 is an apparatus to facilitate HE for machine learning and neural networks using high-throughput CRT evaluation. The apparatus of Example 1 comprises a hardware accelerator to: receive a ciphertext generated by homomorphic encryption (HE) for evaluation; decompose coefficients of the ciphertext into a set of decomposed coefficients; multiply the decomposed coefficients using a set of smaller modulus determined based on a larger modulus; and convert results of the multiplying back to an original form corresponding to the larger modulus.

In Example 2, the subject matter of Example 1 can optionally include wherein the decomposed coefficients are multiplied independently from one another using the smaller modulus. In Example 3, the subject matter of any one of Examples 1-2 can optionally include wherein the smaller modulus comprise at least one of generalized Mersenne primes or pseudo Mersenne primes. In Example 4, the subject matter of any one of Examples 1-3 can optionally include wherein the hardware accelerator to decompose the coefficients comprises the hardware accelerator to perform a Chinese remainder theorem (CRT) decomposition of the coefficients.

In Example 5, the subject matter of any one of Examples 1-4 can optionally include wherein the hardware accelerator further comprises a set of multiplier circuits, reduction circuits, addition circuits, and modular reduction circuits to perform the CRT decomposition of the coefficients. In Example 6, the subject matter of any one of Examples 1-5 can optionally include wherein the hardware accelerator to convert the results comprises the hardware accelerator to perform a reverse Chinese remainder theorem (CRT) transform on the results of the multiplying.

In Example 7, the subject matter of any one of Examples 1-6 can optionally include wherein the hardware accelerator further comprises a set of multiplier circuits, 2 m to m Barrett circuits, ripple carry circuits, upper m-bits Barrett circuits, and reduction circuits to perform the reverse CRT transform of the results. In Example 8, the subject matter of any one of Examples 1-7 can optionally include wherein the hardware accelerator comprises a set of circuits comprising at least one of multiplier circuits, reduction circuits, ripple addition accumulator, Barrett circuit, or addition circuit.

In Example 9, the subject matter of any one of Examples 1-8 can optionally include wherein the set of circuits are used to perform each of the decomposing, multiplying, and converting. In Example 10, the subject matter of any one of Examples 1-9 can optionally include wherein the hardware accelerator comprises a set of multiplier circuits and reduction circuits to perform the multiplying the decomposed coefficients.

Example 11 is a method for facilitating HE for machine learning and neural networks using high-throughput CRT evaluation. The method of Example 11 can optional include receiving, by a hardware accelerator of a computing device, a ciphertext generated by homomorphic encryption (HE) for evaluation; decomposing, by the hardware accelerator, coefficients of the ciphertext into a set of decomposed coefficients; multiplying, by the hardware accelerator, the decomposed coefficients using a set of smaller modulus determined based on a larger modulus; and converting, by the hardware accelerator, results of the multiplying back to an original form corresponding to the larger modulus.

In Example 12, the subject matter of Example 11 can optionally include wherein the decomposed coefficients are multiplied independently from one another using the smaller modulus comprising at least one of generalized Mersenne primes or pseudo Mersenne primes. In Example 13, the subject matter of any one of Examples 11-12 can optionally include wherein the hardware accelerator to decompose the coefficients comprises the hardware accelerator to perform a Chinese remainder theorem (CRT) decomposition of the coefficients, and wherein the hardware accelerator further comprises a set of multiplier circuits, reduction circuits, addition circuits, and modular reduction circuits to perform the CRT decomposition of the coefficients.

In Example 14, the subject matter of any one of Examples 11-13 can optionally include wherein the hardware accelerator to convert the results comprises the hardware accelerator to perform a reverse Chinese remainder theorem (CRT) transform on the results of the multiplying, and wherein the hardware accelerator further comprises a set of multiplier circuits, 2 m to m Barrett circuits, ripple carry circuits, upper m-bits Barrett circuits, and reduction circuits to perform the reverse CRT transform of the results. In Example 15, the subject matter of any one of Examples 11-14 can optionally include wherein the hardware accelerator comprises a set of circuits comprising at least one of multiplier circuits, reduction circuits, ripple addition accumulator, Barrett circuit, or addition circuit. In Example 16, the subject matter of any one of Examples 11-15 can optionally include wherein the hardware accelerator comprises a set of multiplier circuits and reduction circuits to perform the multiplying the decomposed coefficients.

Example 17 is a system to facilitate HE for machine learning and neural networks using high-throughput CRT evaluation. The system of Example 17 comprises a memory; and a hardware accelerator communicably coupled to the memory, the hardware accelerator to implement a Chinese remainder theorem (CRT) multiplier circuit comprising a set of m by m multipliers, 2 m to m reduction circuits, a ripple addition accumulator, and a modular reduction circuit, the set to: receive, from the memory, a ciphertext generated by homomorphic encryption (HE) for evaluation; decompose coefficients of the ciphertext into a set of decomposed coefficients; multiply the decomposed coefficients using a set of smaller modulus determined based on a larger modulus; and convert results of the multiplying back to an original form corresponding to the larger modulus.

In Example 18, the subject matter of Example 17 can optionally include wherein the decomposed coefficients are multiplied independently from one another using the smaller modulus comprising at least one of generalized Mersenne primes or pseudo Mersenne primes. In Example 19, the subject matter of any one of Examples 17-18 can optionally include wherein the CRT multiplier circuit to decompose the coefficients using a CRT decomposition of the coefficients. In Example 20, the subject matter of any one of Examples 17-19 can optionally include wherein the CRT multiplier circuit to convert the results using a reverse CRT transform on the results of the multiplying.

Example 21 is a non-transitory computer-readable storage medium for facilitating HE for machine learning and neural networks using high-throughput CRT evaluation. The non-transitory computer-readable storage medium of Example 21 comprises executable computer program instructions that, when executed by one or more processors, cause the one or more processors to perform operations comprising: receiving, by a hardware accelerator of a computing device, a ciphertext generated by homomorphic encryption (HE) for evaluation; decomposing, by the hardware accelerator, coefficients of the ciphertext into a set of decomposed coefficients; multiplying, by the hardware accelerator, the decomposed coefficients using a set of smaller modulus determined based on a larger modulus; and converting, by the hardware accelerator, results of the multiplying back to an original form corresponding to the larger modulus.

In Example 22, the subject matter of Example 21 can optionally include wherein the decomposed coefficients are multiplied independently from one another using the smaller modulus comprising at least one of generalized Mersenne primes or pseudo Mersenne primes. In Example 23, the subject matter of any one of Examples 21-22 can optionally include wherein the hardware accelerator to decompose the coefficients comprises the hardware accelerator to perform a Chinese remainder theorem (CRT) decomposition of the coefficients, and wherein the hardware accelerator further comprises a set of multiplier circuits, reduction circuits, addition circuits, and modular reduction circuits to perform the CRT decomposition of the coefficients.

In Example 24, the subject matter of any one of Examples 21-23 can optionally include wherein the hardware accelerator to convert the results comprises the hardware accelerator to perform a reverse Chinese remainder theorem (CRT) transform on the results of the multiplying, and wherein the hardware accelerator further comprises a set of multiplier circuits, 2 m to m Barrett circuits, ripple carry circuits, upper m-bits Barrett circuits, and reduction circuits to perform the reverse CRT transform of the results. In Example 25, the subject matter of any one of Examples 21-24 can optionally include wherein the hardware accelerator comprises a set of circuits comprising at least one of multiplier circuits, reduction circuits, ripple addition accumulator, Barrett circuit, or addition circuit. In Example 26, the subject matter of any one of Examples 21-25 can optionally include wherein the hardware accelerator comprises a set of multiplier circuits and reduction circuits to perform the multiplying the decomposed coefficients.

Example 27 is an apparatus for facilitating HE for machine learning and neural networks using high-throughput CRT evaluation, according to implementations of the disclosure. The apparatus of Example 27 can comprise means for receiving, by a hardware accelerator of a computing device, a ciphertext generated by homomorphic encryption (HE) for evaluation; means for decomposing, by the hardware accelerator, coefficients of the ciphertext into a set of decomposed coefficients; means for multiplying, by the hardware accelerator, the decomposed coefficients using a set of smaller modulus determined based on a larger modulus; and means for converting, by the hardware accelerator, results of the multiplying back to an original form corresponding to the larger modulus.

In Example 28, the subject matter of Example 27 can optionally include the apparatus further configured to perform the method of any one of the Examples 12 to 16.

Example 29 is at least one machine readable medium comprising a plurality of instructions that in response to being executed on a computing device, cause the computing device to carry out a method according to any one of Examples 11-16. Example 30 is an apparatus for facilitating HE for machine learning and neural networks using high-throughput CRT evaluation, configured to perform the method of any one of Examples 11-16. Example 31 is an apparatus for facilitating HE for machine learning and neural networks using high-throughput CRT evaluation comprising means for performing the method of any one of claims 11 to 16. Specifics in the Examples may be used anywhere in one or more embodiments.

In the description above, for the purposes of explanation, numerous specific details are set forth in order to provide a thorough understanding of the described embodiments. It can be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their basic form, but processes can be added to or deleted from any of the methods and information can be added or subtracted from any of the described messages without departing from the basic scope of the present embodiments. It may be apparent to those skilled in the art that many further modifications and adaptations can be made. The particular embodiments are not provided to limit the concept but to illustrate it. The scope of the embodiments is not to be determined by the specific examples provided above but by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
a hardware accelerator device comprising hardware circuitry to improve processing unit utilization and latency of computing operations on homomorphically-encrypted data, the hardware circuitry comprising:
coefficient decomposition hardware circuitry to:
receive a ciphertext generated by homomorphic encryption (HE) for evaluation; and
decompose coefficients of the ciphertext into a set of decomposed coefficients by applying a Chinese remainder theorem (CRT) decomposition to the coefficients;
multiplier hardware circuitry to receive the set of decomposed coefficient from the coefficient decomposition hardware circuitry and multiply the decomposed coefficients independently from one another using a set of smaller modulus determined based on a larger modulus; and
modular conversion hardware circuitry to convert results received from the multiplier hardware circuitry back to an original form corresponding to the larger modulus.

2. The apparatus of claim 1, wherein the smaller modulus comprise at least one of generalized Mersenne primes or pseudo Mersenne primes.

3. The apparatus of claim 1, wherein the hardware accelerator further comprises a set of multiplier circuits, reduction circuits, addition circuits, and modular reduction circuits to perform the CRT decomposition of the coefficients.

4. The apparatus of claim 1, wherein the hardware accelerator to convert the results comprises the hardware accelerator to perform a reverse Chinese remainder theorem (CRT) transform on the results of the multiplying.

5. The apparatus of claim 4, wherein the hardware accelerator further comprises a set of multiplier circuits, 2 m to m Barrett circuits, ripple carry circuits, upper m-bits Barrett circuits, and reduction circuits to perform the reverse CRT transform of the results.

6. The apparatus of claim 1, wherein the hardware accelerator comprises a set of circuits comprising at least one of multiplier circuits, reduction circuits, ripple addition accumulator, Barrett circuit, or addition circuit.

7. The apparatus of claim 6, wherein the set of circuits are used to perform each of the decomposing, multiplying, and converting.

8. The apparatus of claim 1, wherein the hardware accelerator comprises a set of multiplier circuits and reduction circuits to perform the multiplying the decomposed coefficients.

9. A method comprising:
receiving, by coefficient decomposition hardware circuitry of a hardware accelerator of a computing device, a ciphertext generated by homomorphic encryption (HE) for evaluation, wherein the hardware accelerator device to improve processing unit utilization and latency of computing operations on homomorphically-encrypted data;
decomposing, by the coefficient decomposition hardware circuitry of the hardware accelerator, coefficients of the ciphertext into a set of decomposed coefficients by applying a Chinese remainder theorem (CRT) decomposition to the coefficients;
multiplying, by multiplier hardware circuitry of the hardware accelerator, the decomposed coefficients independently from one another using a set of smaller modulus determined based on a larger modulus; and
converting, by modular conversion hardware circuitry of the hardware accelerator, results of the multiplying back to an original form corresponding to the larger modulus.

10. The method of claim 9, wherein the decomposed coefficients are multiplied independently from one another using the smaller modulus comprising at least one of generalized Mersenne primes or pseudo Mersenne primes.

11. The method of claim 9, wherein the hardware accelerator further comprises a set of multiplier circuits, reduction circuits, addition circuits, and modular reduction circuits to perform the CRT decomposition of the coefficients.

12. The method of claim 9, wherein the hardware accelerator to convert the results comprises the hardware accelerator to perform a reverse Chinese remainder theorem (CRT) transform on the results of the multiplying, and wherein the hardware accelerator further comprises a set of multiplier circuits, 2 m to m Barrett circuits, ripple carry circuits, upper m-bits Barrett circuits, and reduction circuits to perform the reverse CRT transform of the results.

13. The method of claim 9, wherein the hardware accelerator comprises a set of circuits comprising at least one of multiplier circuits, reduction circuits, ripple addition accumulator, Barrett circuit, or addition circuit.

14. The method of claim 9, wherein the hardware accelerator comprises a set of multiplier circuits and reduction circuits to perform the multiplying the decomposed coefficients.

15. A system comprising:
a memory; and
a hardware accelerator communicably coupled to the memory, the hardware accelerator to improve processing unit utilization and latency of computing operations on homomorphically-encrypted data by implementing a Chinese remainder theorem (CRT) multiplier circuit comprising a set of m by m multipliers, 2 m to m reduction circuits, a ripple addition accumulator, and a modular reduction circuit, wherein the CRT multiplier circuit to:
receive, from the memory, a ciphertext generated by homomorphic encryption (HE) for evaluation;
decompose coefficients of the ciphertext into a set of decomposed coefficients by applying a CRT decomposition to the coefficients;
multiply the decomposed coefficients independently from one another using a set of smaller modulus determined based on a larger modulus; and
convert results of the multiplying back to an original form corresponding to the larger modulus.

16. The system of claim 15, wherein the decomposed coefficients are multiplied independently from one another using the smaller modulus comprising at least one of generalized Mersenne primes or pseudo Mersenne primes.

17. The system of claim 15, wherein the CRT multiplier circuit to convert the results using a reverse CRT transform on the results of the multiplying.

* * * * *